(No Model.)
C. W. NASON.
MANUFACTURE OF RADIATORS.
No. 427,240. Patented May 6, 1890.
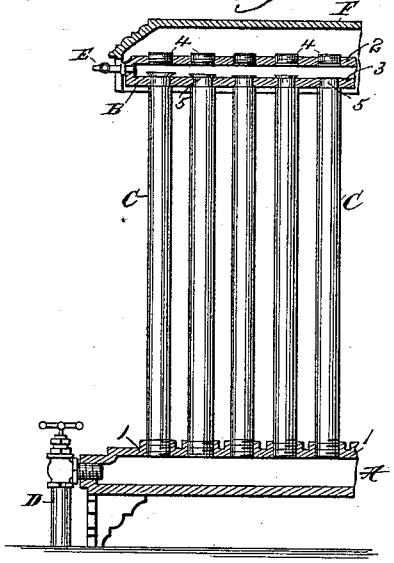
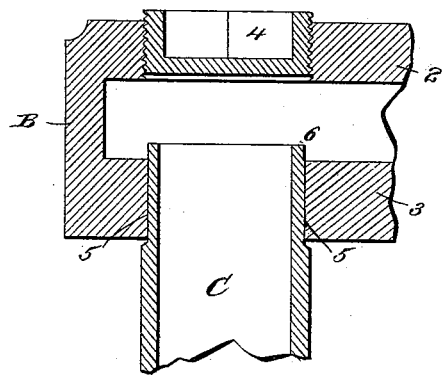
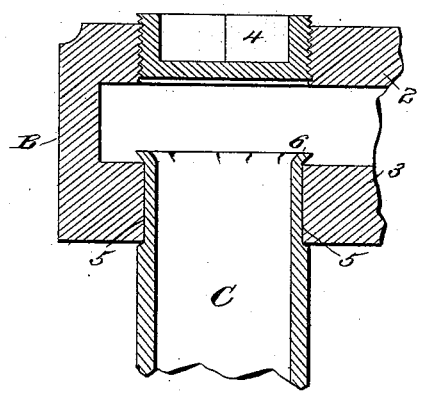
Attest:
Geo H Potts
J J Kennedy
Inventor
Carleton W. Nason
By Philipp, Phelps & Henry
Attys

UNITED STATES PATENT OFFICE.

CARLETON W. NASON, OF NEW YORK, N. Y.

MANUFACTURE OF RADIATORS.

SPECIFICATION forming part of Letters Patent No. 427,240, dated May 6, 1890.

Application filed November 25, 1889. Serial No. 331,460. (No model.)

*To all whom it may concern:*

Be it known that I, CARLETON W. NASON, a citizen of the United States, residing at New York, county of New York, and State of New York, have invented certain new and useful Improvements in the Method of Forming Joints with Wrought Iron or Steel Pipe, fully described and represented in the following specification and the accompanying drawings, forming a part of the same.

This invention relates to a method of forming a tight joint with wrought-iron or steel pipe, its object being to provide a simple and cheap method of forming such joints where, for any reason, the use of a screw-joint is impossible or undesirable.

In many classes of manufactures, especially those intended for use with steam or other fluid under pressure, it is frequently necessary to form a tight joint between a pipe and a casing or other part where it is inconvenient or impossible to use the ordinary screw-joint. This is especially the case in the manufacture of hot-water or steam radiators in which the conducting-pipes are connected by tight joints to top and base casings forming the upper and lower chambers connecting the pipes; and my invention will be described and illustrated in connection with the manufacture of such radiators.

In radiators of the construction referred to it is evident that a screw-joint can be made at but one end of the pipe, except by the slow and difficult, and therefore expensive, process of forming the pipes with right and left screws at the opposite ends and screwing all the pipes simultaneously into their places in the two casings, and various methods have been resorted to to avoid this difficulty.

One of the most common methods now in use in the manufacture of radiators is that in which boiler-tubing is used for the pipes, and the joint formed by use of an expander, the material of which such tubing is made stretching to permit considerable expansion; but this is an expensive method on account of the cost of boiler-tubing, it being more than double that of wrought-iron or steel pipe. Moreover, such tubing varies to some extent in outside diameter, owing to the process by which it is made, so that a close joint cannot be obtained prior to expansion, the result being that much expansion of the body of the tube inside the wall of the casing is necessary, and any imperfect expansion may result in the formation of a leaky joint. I greatly lessen the cost of the radiator, while improving its construction, by providing a method for forming a tight joint with wrought-iron or steel pipe, whereby this much cheaper material may be used, an ordinary screw-joint being made at one end of the pipe, and the joint at the other end being formed by my method of expansion.

Many attempts have been made to provide some cheap and convenient method of manufacturing radiators of wrought-iron or steel pipe, and many devices have been used for connecting such pipe to the second casing after a screw-joint with the first casing has been formed at one end of the pipe. The joint, however, has never been formed by expansion on account of the character of wrought-iron or steel pipe, which makes it impossible to expand it in its ordinary form, and which have caused such a joint to be considered as impracticable.

The difficulties in the way of expansion are well known. The pipe varies in size to a considerable extent, and is not perfectly round, thus making it impossible to secure a tight fit in the casing, while it is of such quality that it will not bear stretching, as boiler-tubing will, and therefore cannot be thus made to compensate for variations in size and shape. The pipe, also, is rough and full of longitudinal surface-seams, and is covered with a scale, all these acting to prevent the formation of a tight joint. I attain the end desired by reducing the thickness of the pipe at the end at which the joint is to be formed by removing a portion of the outside of the pipe for a distance such as to enable the reduced portion to pass through the wall of the casing sufficiently for the purpose of expansion, the opening in the casing being made to closely fit the reduced end of the pipe. This reduction of the pipe will preferably be made by the use of a cutting-die, either expansion or solid, this being a cheap and satisfactory method; but any other of the well-known processes may be used—such as turning or milling—which will give a smooth and uniform surface to the outside of the pipe, so that when driven into the wall of the casing the pipe will closely fit the sides of the opening and form an approximately close joint previous to expansion. The reduction in the thickness of the pipe, while giving a smooth surface, also makes it possible to expand the pipe very slightly, which is not possible with pipe of full thickness. In practice it is found that this slight expansion is sufficient, so that with a pipe reduced as described it is possible to form an absolutely tight joint.

The advantages of the use of my method in the manufacture of radiators are apparent. I am thus enabled to substitute for the boiler-tubing previously in use the much cheaper material, wrought-iron pipe, thus reducing greatly the cost of manufacture. The joint produced, moreover, is better, all danger of a leaky joint being obviated, as stated above.

A full description of my invention will now be given, reference being had to the accompanying drawings, in which my method is illustrated as applied to the manufacture of a hot-water or steam radiator, and in which—

Figure 1 is a vertical longitudinal section of one end of a radiator; and Figs. 2 and 3 are views showing, full size, the joint between the pipe and the casing previous to and after expansion.

A is the base, and B the top casing of the radiator, forming, respectively, the lower and upper chambers with which the pipes C are connected.

D is the pipe for admitting water or steam to the lower chamber; E, the air-cock in the upper chamber, and F the cover, these parts forming a general construction of radiator common in this class of manufactures.

Referring now to the specific features illustrating my invention, it will be seen that the upper wall 1 of the lower casing A is provided with a series of screw-threaded openings to receive the lower ends of the pipes C, and the upper and lower walls 2 3 of the top casing are provided with openings opposite each other, those in the lower wall being adapted to receive the upper ends of the pipes C, and those in the upper wall to permit the insertion of an expander, being closed by the screw-plug 4 after the joint is completed. The pipes C are of wrought-iron or steel pipe, and are screw-threaded at one end to form a screw-joint with casing A, this screw-joint being preferably tapered, as is usual, the other end being reduced in outside diameter to form a close fit with the openings in lower wall 3 of casing B. This reduction in size is made, preferably, by the use of a die, as above stated, and the reduced portion 5 is of sufficient length to pass through or nearly through the casing. As shown in Figs. 2 and 3, the reduced portion passes through and extends beyond the wall of the casing, thus forming a flange inside the casing after expansion. This, however, is not necessary for the formation of the joint, which is made between the outside of the pipe and the side of the opening in the casing; but such a flange is used on some or all of the pipes for the purpose of holding the casing more firmly in place. In Fig. 1 the joints are shown with flanges varying in size, as they will commonly appear in a radiator, the distance to which the pipes are screwed in the lower casing varying somewhat with the slight differences in quality to which wrought-iron or steel pipe is subject. In practice it is found that this flange, being unsupported, will split under the action of the expander, as shown in Fig. 3, the pipe being of such material as not to bear stretching, as boiler-tubing will; but this does not affect the tightness of the joint.

The size of pipes and casings used may vary somewhat; but I have shown in Figs. 2 and 3 a joint formed in a radiator of ordinary size, in which the pipes C are of what is known in the trade as "one-inch pipe," being made of wrought-iron or steel pipe one-eighth of an inch thick. These are reduced upon the outside by any of the processes before referred to, preferably by use of a die, to a thickness of about five sixty-fourths of an inch, fitting closely the openings in wall 3, so that when driven into the casing they form an approximately close joint therewith.

In the construction of the radiator the pipes formed with a screw-thread at one end and a reduced portion at the other end are first screwed into the base casing. The top casing is then placed on the other ends of the pipes, and the pipes and casing driven together until the ends of all or nearly all the pipes project slightly beyond the interior surface of the casing. The position of the shoulders is immaterial, the joint being formed entirely upon the face of the pipe. The expander, which may be of any ordinary form, is then inserted through the openings in the upper wall of the casing, and the pipes successively expanded, the result being the formation of a tight joint, as shown in Fig. 3. The screw-plugs are then inserted in the casing, closing the upper openings and completing the radiator. The cover F may thereafter be added, if desired, for the purpose of embellishment.

While I have shown and described the radiator as formed with an expanded joint at the upper end of the pipes, it is evident that the other end or both ends may be joined to the casings by expansion. The use of the screw-joint at one end, however, is preferable on account of the relative cheapness of this joint.

It will be understood that I have illustrated only one application of my invention, but that it is of universal application wherever a tight joint between a wrought-iron or steel pipe and a casing or other part is desired.

What I claim is—

The herein-described method of forming a joint between wrought-iron or steel pipe and a radiator-casing, consisting in reducing the outside diameter of the pipe for a portion of its length to form a close fit in an opening in the casing with which the joint is to be made, forcing the reduced end of the pipe into or through said opening, forming a screw-threaded opening in said casing opposite the first-mentioned opening, introducing an expander through said screw-threaded opening and expanding the reduced end of the pipe thereby, then withdrawing said expander, and then inserting a screw-plug into said screw-threaded opening, substantially as described.

In testimony whereof I have hereunto set my hand in the presence of two subscribing witnesses.

CARLETON W. NASON.

Witnesses:
A. D. NEAL,
CHAS. E. CORYELL.